United States Patent
Chae et al.

(10) Patent No.: US 9,769,114 B2
(45) Date of Patent: Sep. 19, 2017

(54) METHOD AND SYSTEM FOR PROVIDING OPTIMIZED ETHERNET COMMUNICATION FOR VEHICLE

(71) Applicant: Hyundai Motor Company, Seoul (KR)

(72) Inventors: Jun Byung Chae, Seoul (KR); Jin Hwa Yun, Seoul (KR); Kang Woon Seo, Seoul (KR); Dong Ok Kim, Gyeonggi-do (KR); Sang Woo Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 225 days.

(21) Appl. No.: 14/820,227

(22) Filed: Aug. 6, 2015

(65) Prior Publication Data

US 2016/0308822 A1    Oct. 20, 2016

(30) Foreign Application Priority Data

Apr. 16, 2015 (KR) .................. 10-2015-0053721

(51) Int. Cl.
*G06F 15/16* (2006.01)
*H04L 29/12* (2006.01)
(Continued)

(52) U.S. Cl.
CPC ...... *H04L 61/2007* (2013.01); *H04L 61/2038* (2013.01); *H04L 65/4076* (2013.01);
(Continued)

(58) Field of Classification Search
CPC ............. H04L 61/2007; H04L 61/2038; H04L 65/4076; H04L 67/12; H04L 61/103; H04L 61/6022; H04L 61/6068
See application file for complete search history.

(56) References Cited

U.S. PATENT DOCUMENTS 6,507,810 B2 * 1/2003 Razavi .................. G01C 21/26
703/23
6,754,183 B1 * 6/2004 Razavi .................. G01C 21/26
370/254
(Continued)

FOREIGN PATENT DOCUMENTS

JP    2013-00102393    5/2013
KR    20020010372 A    2/2002
(Continued)

OTHER PUBLICATIONS

Office Action issued in KR application 10-2015-0053721, dated Nov. 20, 2015, pp. 1-8.

*Primary Examiner* — Moustafa M Meky
(74) *Attorney, Agent, or Firm* — Brinks Gilson & Lione

(57) ABSTRACT

Disclosed are methods for allocating an address to an Electronic Control Unit (ECU) on an in-vehicle Ethernet network and devices therefor. A method may include allocating a first address value identifying the in-vehicle Ethernet network, allocating a second address value identifying a domain corresponding to the ECU, allocating a third address value identifying a group of ECUs in the allocated domain, allocating a fourth address value identifying the ECU in the group, and generating an IP address including the allocated first to fourth address values. The generated IP address is set as a fixed IP address of the ECU.

22 Claims, 7 Drawing Sheets

(51) Int. Cl.
*H04L 29/08* (2006.01)
*H04L 29/06* (2006.01)

(52) U.S. Cl.
CPC ............ *H04L 67/12* (2013.01); *H04L 61/103* (2013.01); *H04L 61/6022* (2013.01); *H04L 61/6068* (2013.01)

(56) References Cited

U.S. PATENT DOCUMENTS

| | | | |
|---|---|---|---|
| 6,975,612 B1* | 12/2005 | Razavi | G01C 21/26 370/338 |
| 9,450,911 B2* | 9/2016 | Cha | H04L 41/0809 |
| 2001/0051863 A1* | 12/2001 | Razavi | G01C 21/26 703/23 |
| 2011/0222433 A1* | 9/2011 | Jones | H04L 29/12254 370/254 |
| 2015/0074277 A1* | 3/2015 | Shigeeda | H04L 12/40006 709/226 |

FOREIGN PATENT DOCUMENTS

| | | |
|---|---|---|
| KR | 20100062872 A | 6/2010 |
| KR | 10-2011-0069240 | 6/2011 |
| KR | 20110069240 A | 6/2011 |
| KR | 10-1380118 | 4/2014 |
| KR | 10-2014-0076692 | 6/2014 |

\* cited by examiner

METHOD AND SYSTEM FOR PROVIDING OPTIMIZED ETHERNET COMMUNICATION FOR VEHICLE

CROSS-REFERENCE TO RELATED APPLICATION

This application claims the benefit of Korean Patent Application No. 10-2015-0053721, filed on Apr. 16, 2015, which is hereby incorporated by reference.

FIELD

The present disclosure relates to an in-vehicle Ethernet communication method, and more particularly, to a method and system for providing an optimized Ethernet communication method for a vehicle through which an in-vehicle Ethernet software stack architecture to provide Ethernet communication optimized for vehicle environments is provided, thereby achieving improvements in system processing speed and cost reduction.

BACKGROUND

The statements in this section merely provide background information related to the present disclosure and may not constitute prior art.

In the automobile industry, research into applying conventional Ethernet technology to vehicles is underway.

In current vehicle networks, the number of in-vehicle electronic control units (ECUs) and complexity of the ECUs are increasing and a high bandwidth and fusion are required due to a demand for advanced driver assistance systems (ADASs), infotainment and diagnostic devices.

Therefore, vehicle manufacturers, in-vehicle part manufacturers and in-vehicle semiconductor companies propose requirements for new networks which may replace the conventional vehicle networks.

Accordingly, research for applying Ethernet technology, which is widely used in data communication networks, to a vehicle network is underway.

If Ethernet technology is used as a vehicle network, a high bandwidth may be provided and the number of ECUs and system complexity may be reduced.

Further, if Ethernet is applied to a vehicle network, a conventional heavy cable may be replaced with an Ethernet cable, thereby reducing vehicle weight and overall parts costs.

For these reasons, major international vehicle companies are recently carrying out research and development of commercial products by applying Ethernet technology to vehicles and standards organizations are actively working on Ethernet standards for in-vehicle networks.

International standards organizations including OPEN-SOG and the like carry out standardization of in-vehicle Ethernet technology, particularly, physical layers, now, and vehicle manufacturers define software stack architectures for application of in-vehicle Ethernet on their own.

However, conventionally used Ethernet technology and Ethernet technology which has been defined in AUTmotive Open System Architecture (AUTOSAR) are not optimized for vehicle environments.

Particularly, an in-vehicle Ethernet software stack architecture defined in AUTOSAR has elements which are not adapted to vehicle environments. Thus network processing speed may be lowered, and usage of a memory in an ECU is increased, thereby increasing overall system load and costs.

SUMMARY

The present disclosure is directed to methods and systems for providing an optimized Ethernet communication method for a vehicle that substantially addresses one or more problems due to limitations and disadvantages of the related art.

An object of the present disclosure is to provide methods and systems for providing an optimized Ethernet communication method for a vehicle.

Another object of the present disclosure is to provide a software hierarchical structure for supporting Ethernet communication optimized for vehicle environments.

Another object of the present disclosure is to provide methods and systems for providing an optimized Ethernet communication method for a vehicle through which network management/control/diagnosis message transmission functions in a conventional Controller Area Network (CAN) may be provided to Ethernet environments.

Another object of the present disclosure is to provide an Ethernet middleware structure adapted to vehicle environments.

Another object of the present disclosure is to provide methods and systems for providing an optimized Ethernet communication method for a vehicle through which a network initialization speed may be improved by applying a static IP allocation policy to each ECU in the vehicle.

Yet another object of the present disclosure is to provide methods and systems for providing an optimized Ethernet communication method for a vehicle through which a system processing speed and complexity may be improved by deleting and/or integrating unnecessary modules and functions in a conventional Ethernet software architecture.

Additional advantages, objects, and features will be set forth in part in the description which follows and in part will become apparent to those having ordinary skill in the art upon examination of the following or may be learned from practice of the invention. The objectives and other advantages may be realized and attained by the structure particularly pointed out in the written description and claims hereof as well as the appended drawings.

To achieve these objects and other advantages, as embodied and broadly described herein, a method for allocating an address to an Electronic Control Unit (ECU) on an in-vehicle Ethernet network includes allocating a first address value to identify the in-vehicle Ethernet network, allocating a second address value to identify a domain corresponding to the ECU, allocating a third address value to identify a group of ECUs in the allocated domain, allocating a fourth address value to identify the ECU in the group, and generating an IP address including the allocated first to fourth address values, wherein the generated IP address is set as a fixed IP address of the ECU.

An interconnection structure of at least one ECU included in the group may be identified using the fourth address value.

Further, the IP address may have an Internet Protocol version 4 (IPv4) address scheme.

Further, the IP address may be allocated within the range of class A of private internet addresses defined in Request For Comment 1918 (RFC-1918).

Further, multicasting on the in-vehicle Ethernet network may be controlled using the first to fourth address values of an IP packet to be transmitted.

Broadcasting in a gateway unit may be controlled using the first and second address values included in a destination IP address.

Further, broadcasting in a domain unit may be controlled using the first and third address values included in a destination IP address.

Further, broadcasting in a group unit may be controlled using the first and fourth address values included in a destination IP address.

Further, the group may include at least one ECU requiring the same security level.

Further, the domain may include at least one of a body domain, a powertrain domain, a multimedia domain and a chassis domain.

In another aspect of the disclosure, a device for allocating an address to an Electronic Control Unit (ECU) connected to an in-vehicle Ethernet network includes a unit to receive first information to identify a domain connected to a gateway, a unit to receive second information to identify the ECU in the domain, a unit to generate an IP address corresponding to the first and second information with reference to a pre-defined IP address allocation rule, and a unit to allocate the generated IP address to the ECU.

Here, the domain may include at least one of a body domain, a powertrain domain, a multimedia domain and a chassis domain.

Further, the second information may include third information to identify a group in the domain and fourth information to identify an interconnection structure of ECUs in the group and an ECU type.

Further, the group may include at least one ECU requiring the same security level.

The device may further include a unit to transmit the IP address allocated to the ECU to the gateway, and the gateway may set the allocated IP address as a fixed IP address of the ECU.

The device may further include a unit to generate an in-vehicle Ethernet routing table in which IP addresses according to domains and groups are mapped and a unit to transmit the generated in-vehicle. Ethernet routing table to the gateway.

In yet another aspect of the present disclosure, a gateway for allocating an address to an Electronic Control Unit (ECU) connected to an in-vehicle Ethernet network by interworking with an external device includes a unit to receive an in-vehicle Ethernet routing table, in which IP addresses allocated to the ECU according to domains and groups of the in-vehicle Ethernet network are mapped, from the external device, a unit to set an IP address allocated to the ECU using the in-vehicle Ethernet routing table, and a unit to transmit the in-vehicle Ethernet routing table to the ECU using the set IP address, wherein the gateway and the ECU control transmission and reception of an IP packet using the in-vehicle Ethernet routing table.

When the IP packet is received, multicasting on the in-vehicle Ethernet network may be controlled using a destination IP address included in the IP packet and the in-vehicle Ethernet routing table.

Further, the IP address may include a first address value to identify the gateway, a second value to identify a domain connected to the gateway, a third value to identify a group in the domain, and a fourth value to identify an ECU type in the group.

Further, broadcasting in a gateway unit may be controlled using the first and second address values included in the destination IP address.

Further, broadcasting in a domain unit may be controlled using the first and third address values included in the destination IP address.

Further, broadcasting in a group unit may be controlled using the first and fourth address values included in the destination IP address.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
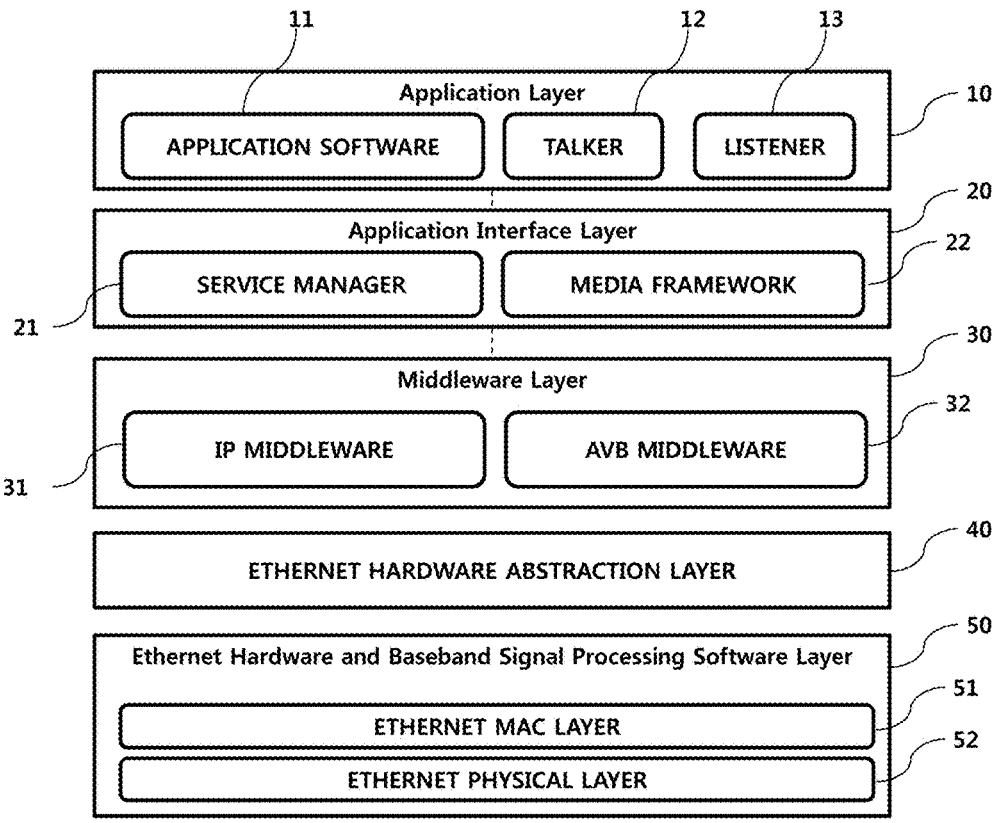
FIG. 1 is a block diagram illustrating a software hierarchical structure of an electronic control unit mounted in a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the preferred embodiments of the present invention, examples of which are illustrated in the accompanying drawings. The suffixes "module" and "unit" in elements used in the description below are given or used together only in consideration of ease in preparation of the specification and do not have distinctive meanings or functions.

Although the described embodiments include all elements as being combined into one unit or operated as one unit, the present invention is not limited thereto. That is, all elements may be selectively combined into one or more units and thus operated within the scope of the present invention. Further, although all elements may be implemented as independent hardware components, some or all of the respective elements may be selectively combined and implemented as a computer program having a program module in which one or plural hardware components perform the functions of the combined elements. Codes and code segments of such a computer program may be easily deduced by those skilled in the art. The computer program may be recorded in computer readable media and read and executed by a computer. Computer readable storage media may include magnetic storage media, optical storage media, carrier wave media and the like.

In the following description, it will be understood that the terms "including", "comprising" and "having" mean presence of corresponding elements, unless there is an opposite statement, and does not exclude presence of one or more other elements. All terms including technical or scientific terms have the same meanings as those which are generally understood by those skilled in the art, unless they are defined as having different meanings. The terms which are generally used, such as terms defined in dictionaries, are interpreted as having the same meanings as contextual meanings in the related art and should not be interpreted as having ideally or excessively formal meanings, unless they are apparently defines in the description.

Further, it will be understood that the terms first, second, A, B, (a), (b), etc. may be used herein to describe various elements of the present invention. These terms are used only to discriminate one element from other elements, and the nature, order, or sequence of the corresponding element is not limited by these terms. If it is stated that an element is "connected to", "combined with", or "coupled with" another element, it will be understood that the former may be directly connected to or combined with the latter or other elements may be interposed between the two elements.

FIG. 1 is a block diagram illustrating a software hierarchical structure of an electronic control unit mounted in a vehicle.

With reference to FIG. 1, a software hierarchical structure may include an application layer 10, an application interface layer 20, a middleware layer 30, an Ethernet hardware abstraction layer 40 and an Ethernet hardware and baseband signal processing software layer 50.

The application layer 10 may include application software 11, a talker 12 to transmit an audio video (AV) stream in an audio video bridging (AVB) protocol, and a listener 13 to receive the AV stream.

The application interface layer 20 may provide control signals transmitted and received between the application layer 10 and the middleware layer 30 and subroutines or functions to process user data. For example, the application interface layer 20 may include a service manager 21 providing an application program interface (API) to process control signals and data corresponding to various services related to corresponding application software and a media framework 22 providing real-time environments to control a container format, a transmission protocol and the like necessary for transmission and reception of the AV stream. Here, the media framework 22 may be implemented as a thread separated from the application software 11 and provide environments in which multimedia data may be processed in real time.

Here, the application software 11 may include a media player, an audio/video editor, a navigation system and the like. The middleware layer 30 may include Internet protocol (IP) middleware 31 and audio video bridging (AVB) middleware 32. Here, AVB is a standard protocol established to improve a transmission quality of a service stream sensitive to time, such as audio/video, in in-vehicle Ethernet environments.

The IP middleware 31 may perform a function of synchronizing and managing the overall in-vehicle Ethernet state through network management messages between nodes connected to an in-vehicle Ethernet network, hereinafter, referred to as NM messages, communication and a function of processing IP packets for controlling operations and states of the respective nodes, hereinafter, referred to as command and control (CC) messages.

Further, the IP middleware 31 may perform a function of diagnosing the states of the nodes through IP packet communication.

Further, the IP middleware 31 may perform a function of sensing and processing a transmission error of the IP packet on the in-vehicle Ethernet network, hereinafter, an Internet Control Message Protocol (ICMP). In general, an IP protocol provides an unreliable and connectionless datagram transmission service. Therefore, the IP middleware 31 may perform a function of generating a designated error reporting message and transmitting the error reporting message to a source when an error of the received IP packet is sensed, or generating a reply message corresponding to a query message and transmitting the reply message to an external terminal, for example, the terminal of a network manager, when the query message is received from the external terminal.

Further, the IP middleware 31 may provide Address Resolution Protocol (ARP) for acquiring a Media Access Control (MAC) address from an IP address. For example, in order to acquire the MAC address of a node B, a node A may broadcast a designated ARP request message including the address of the node B to an in-vehicle Ethernet network. Here, remaining nodes except for the node B ignore the received ARP request message and the node B transmits an ARP reply message including the MAC address thereof to the node A.

Further, the IP middleware 31 may provide Transmission Control Protocol (TCP) and User Data Protocol (UDP). A TCP layer is a higher layer than an IP layer and may perform functions which are not provided by the IP layer, i.e., functions related to data correction, such as a data omission test, a packet reception order test and the like. On the other hand, a UDP layer is a higher layer than the IP layer but does not check a packet reception order, differently from the TCP layer.

The AVB middleware 32 may provide a media streaming function according to IEEE 802.1AS generalized Precision Time protocol (gPTP) and IEEE 802.1AS in which a procedure to acquire more precise time information between nodes is defined.

The Ethernet hardware abstraction layer 40 may perform a function of providing various functions, i.e., a Kernel Programming Interface (KPI), to the programmer of the middleware layer 30 so that an Ethernet hardware device may create an independent program, by providing a virtual hardware platform to the middleware layer 30.

The Ethernet hardware and baseband signal processing software layer 50 may include an Ethernet MAC layer 51 and an Ethernet physical layer 52.

For example, the Ethernet MAC layer 51 may include a MAC layer defined by IEEE 802.3 and a MAC layer defined by IEEE 802.1. The MAC, layer defined by IEEE 802.1 may include a time stamping function defined by IEEE 802.1AS and stream reservation protocol (SRP) and a traffic shaping function defined by IEEE 802.1Q.

Figure 2:
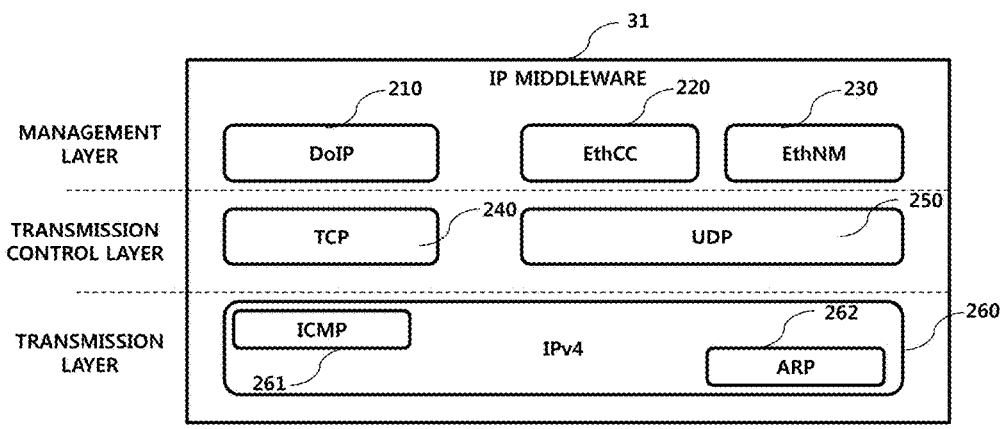
FIG. 2 is a block diagram illustrating a protocol structure of IP middleware.

FIG. 2 is a block diagram illustrating a protocol structure of IP middleware.

With reference to FIG. 2, the IP middleware 31 may include a management layer including Diagnostic communication over Internet (DoIP) 210, Ethernet Command and control (EthCC) 220 and Ethernet Network Management (EthNM) 230, a transmission control layer providing communication using TCP 240 and UDP 250, and a transmission layer providing IPv4 communication including Internet Control Message Protocol (ICMP) 261 and Address Resolution Protocol (ARP) 260.

As exemplarily shown in FIG. 2, IP addresses allocated to respective nodes in the in-vehicle Ethernet network depends on an IPv4 address scheme and IPv6 is not used. Further, the IP addresses allocated to respective nodes in accordance with one invention may be defined so that, among private Internet addresses defined in RFC-1918, only class A may be used.

Further, in the IP addresses allocated to respective nodes, an IP address allocation rule corresponding to a domain and a group may be pre-defined, and a fixed IP address corresponding to a corresponding electronic control unit may be automatically allocated according to the pre-defined rule. Therefore, an in-vehicle Ethernet communication system does not require a separate server for dynamic address allocation.

Further, since fixed IP addresses are allocated to respective electronic control units through static IP address allocation, an in-vehicle Ethernet network initialization time may be shortened.

Figure 3:
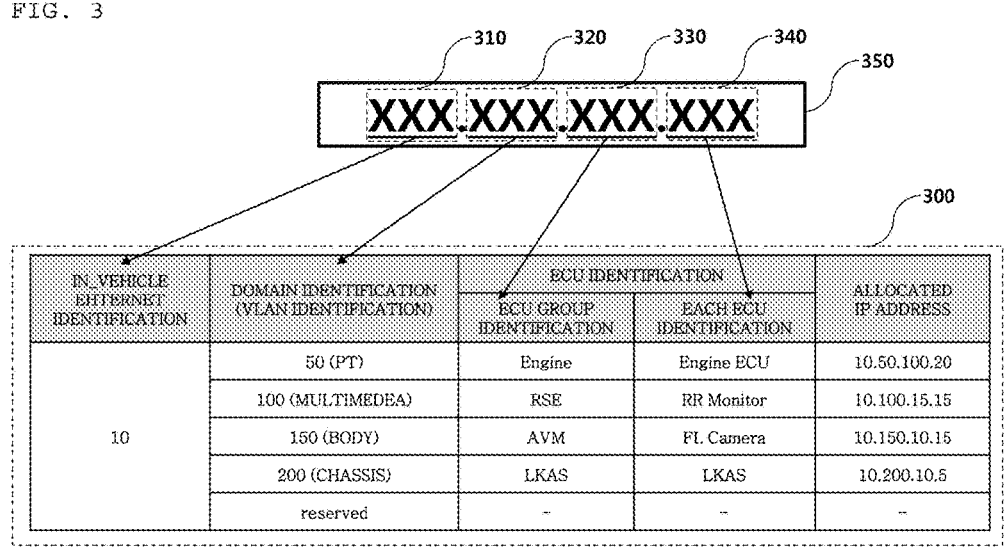
FIG. 3 is an in-vehicle Ethernet routing table illustrating an IP address allocation rule in in-vehicle Ethernet environments.

FIG. 3 is an in-vehicle Ethernet routing table 300 illustrating an IP address allocation rule in in-vehicle Ethernet environments.

With reference to FIG. 3, an IP address 350 may include first to fourth address values 310 to 340 depending on the IPv4 address scheme.

The first address value 310 may be an address value to identify a corresponding IP address allocated to an electronic control unit connected to the in-vehicle Ethernet network. As one example, the first address value 310 to identify an in-vehicle Ethernet IP packet may be defined as 10, as exemplarily shown in the in-vehicle Ethernet routing table 300.

As another example, the first address value 310 may be an address value to identify a specific gateway included in a corresponding in-vehicle Ethernet network. For example, if there are two gateways in a specific in-vehicle Ethernet network, the first address values 310 to identify the respective gateways may be defined as 10 and 20.

The second address value 320 may be an address value to identify a domain connected to the corresponding gateway, i.e., a Virtual Local Area Network (VLAN). Here, the domain may be a powertrain domain, a multimedia domain, a body domain or a chassis domain, and domains may be added or deleted according to vehicle types and options.

The third address value 330 may be an address value to identify a group of electronic control units included in the corresponding domain. Here, the group may be defined based on the function of electronic control units in the corresponding domain, interconnection relations, a required security level and the like of the electronic control units.

The fourth address value 340 may be information to peculiarly identify each electronic control unit in the corresponding group, i.e., ECU type identification information. Further, the fourth address value 340 may be defined such that interconnection structures among the electronic control units in the corresponding group may be identified.

For example, as exemplarily shown in FIG. 3, the first to fourth address values 310 to 340 corresponding to an engine ECU included in an engine group in a powertrain domain of the in-vehicle. Ethernet network may be respectively defined as 10, 50, 100 and 20. For example, a static IP address allocated to the corresponding engine ECU may be 10.50.100.20.

Figure 4:
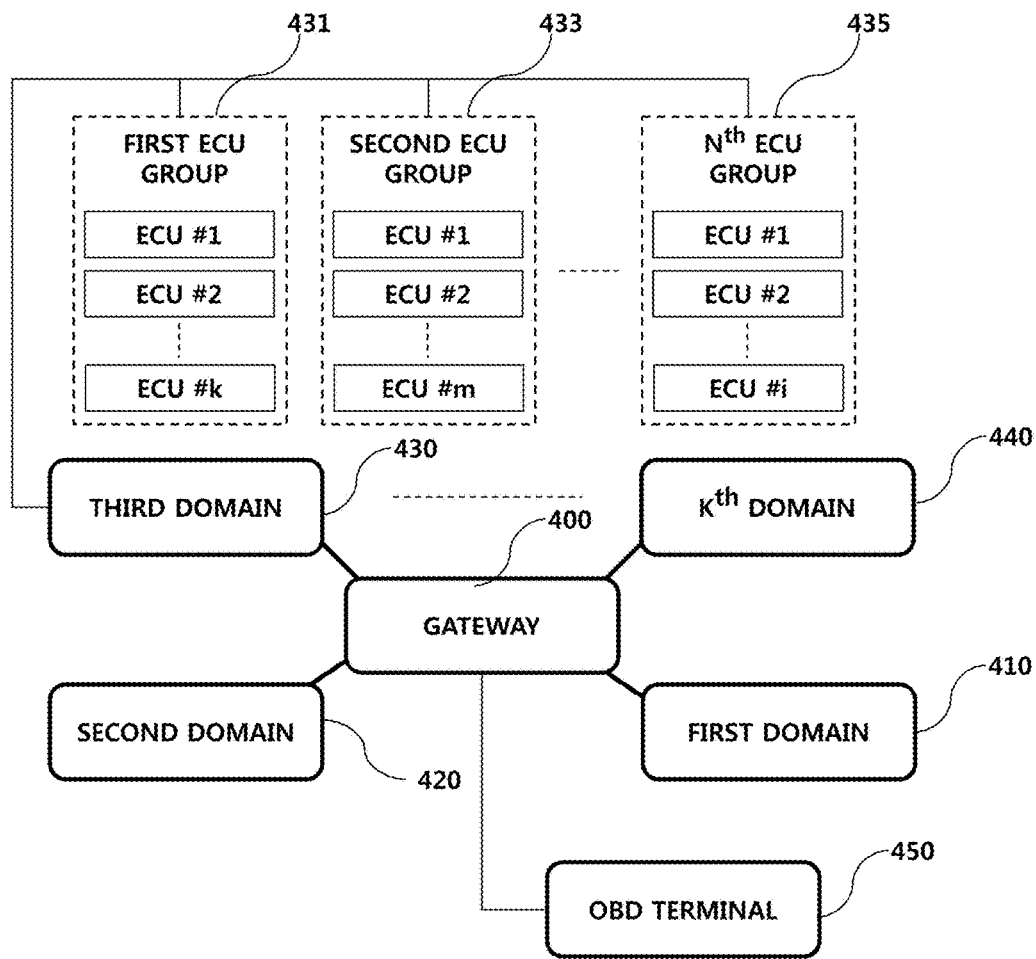
FIG. 4 is a block diagram illustrating a hierarchical structure of an in-vehicle Ethernet system.

FIG. 4 is a block diagram illustrating a hierarchical structure of an in-vehicle Ethernet system.

With reference to FIG. 4, the in-vehicle Ethernet system may have a hierarchical structure including a gateway 400 first to $k^{th}$ domains 410 to 440 connected to the gateway, first to $n^{th}$ ECU groups 431 to 435 included in each of the domains 410 to 440, and at least one electronic control unit included in each of the ECU groups 431 to 435. Here, types and the number of domains connected to the gateway 400 according to vehicle types and options, types and the number of groups according to domains and types and the number of electronic control units according to groups may be different.

Further, an On-Board Diagnostics (OBD) terminal 450 may be connected to the gateway 400 through a designated connection terminal. In this case, the OBD terminal 450 may monitor an IP packet passing via the gateway 400 or diagnose various states of the electronic control unit connected to a corresponding in-vehicle Ethernet network through the gateway 400. For example, the OBD terminal 450 may monitor routing paths of all IP packets or a specific IP packet passing via the gateway 400 and output a result of monitoring through the screen of a display provided on the OBD terminal 450 or connected to the OBD terminal 450. Here, the result of monitoring may be mapped to an actual Ethernet connection arrangement plan of a corresponding vehicle and displayed on the screen of the display.

Further, the OBD terminal 450 may track IP packets in a domain unit, a group unit or an each ECU unit through IP address masking according to user menu selection by interworking with the gateway 400.

Figure 5:
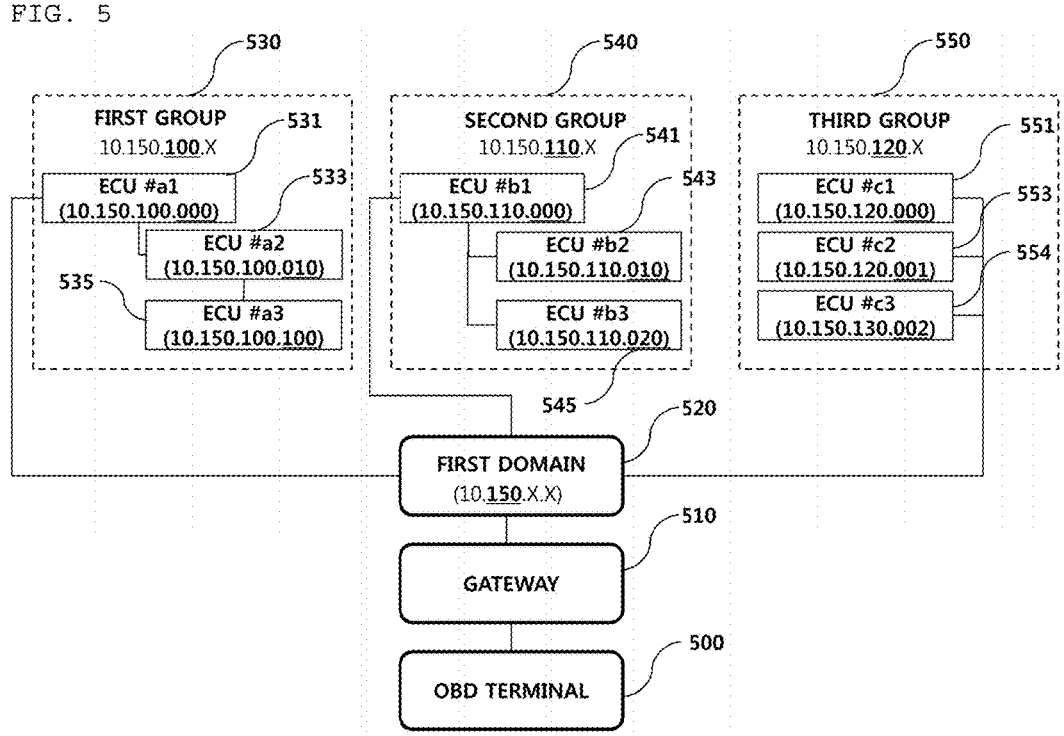
FIG. 5 is a view illustrating a method for allocating an address based on interconnection relations among electronic control units in a group.

FIG. 5 is a view illustrating a method for allocating an address based on interconnection relations among electronic control units in a group.

With reference to FIG. 5, if a first address value 310 corresponding to a gateway 510 is defined as 10 and a second address value 320 corresponding to a first domain 520 connected to the gateway 510 is defined as 150, 100, 110 and 120 may be allocated as third address values 330 to first to third groups 530 to 550, respectively, included in the first domain 520.

As exemplarily shown in FIG. 5, an ECU #a1 531 to an ECU #a3 535 may have sequential connection relations in the form of a daisy chain.

In this case, based on an ECU connection order, i.e., an order in routing an IP packet, 000, 010 and 100 may be allocated as fourth address values 340 to the ECU #a1 531 to the ECU #a3 535, respectively. That is, the fact that the IP packet routed to the first group 530 is transmitted to the ECU #a3 535 sequentially via the ECU #a1 531 and the ECU #a2 533 may be confirmed through only an IP address.

As another example, if an ECU #b1 543 and an ECU #b2 545 are connected to an ECU #b1 541 of the second group 540 in parallel, 000, 010 and 020 may be allocated as fourth address values 340 to the ECU #b1 to the ECU #b3 541 to 545, respectively.

As yet another example, if an ECU #c1 551 to an ECU #c3 555 of the third group 550 are connected in parallel, 000, 001 and 002 may be allocated as fourth address values 340 to the ECU #c1 551 to the ECU #c3 555, respectively.

Therefore, if the OBD terminal 500 monitors an IP packet by interworking with the gateway 510, the OBD terminal 500 may confirm connection relations among ECUs within a corresponding group by analyzing fourth address values 340 included in the IP packet.

Figure 6:
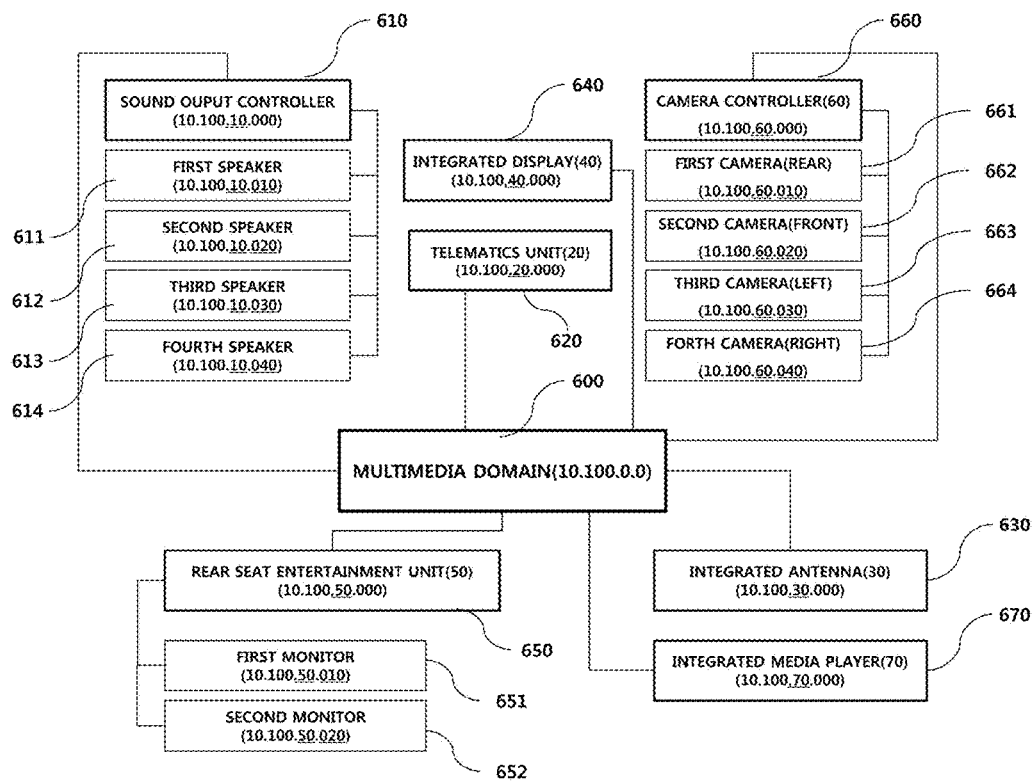
FIG. 6 is a view illustrating an address allocation method in an in-vehicle Ethernet network.

FIG. 6 is a view illustrating an address allocation method in an in-vehicle Ethernet network.

In more detail, FIG. 6 illustrates an example of static IP address allocation of ECUs included in a multimedia domain 600.

The multimedia domain 600 may include at least one of a sound output controller 610, a telematics unit 620, an integrated antenna 630, an integrated display 640, a rear seat entertainment unit 650, a camera controller 660 and an integrated media player 670.

With reference to FIG. 6, the sound output controller 610 may control first to fourth speakers 611 to 614 and the camera controller 660 may control first to fourth cameras 661 to 664. Further, the rear seat entertainment unit 650 may control first and second monitors 651 and 652.

As shown in FIG. 6, for example, IP addresses corresponding to the respective ECUs may be defined and allocated so as not only to identify domains and groups but also to identify connection structures among ECUs within the groups, i.e., hierarchical structures.

Figure 7:
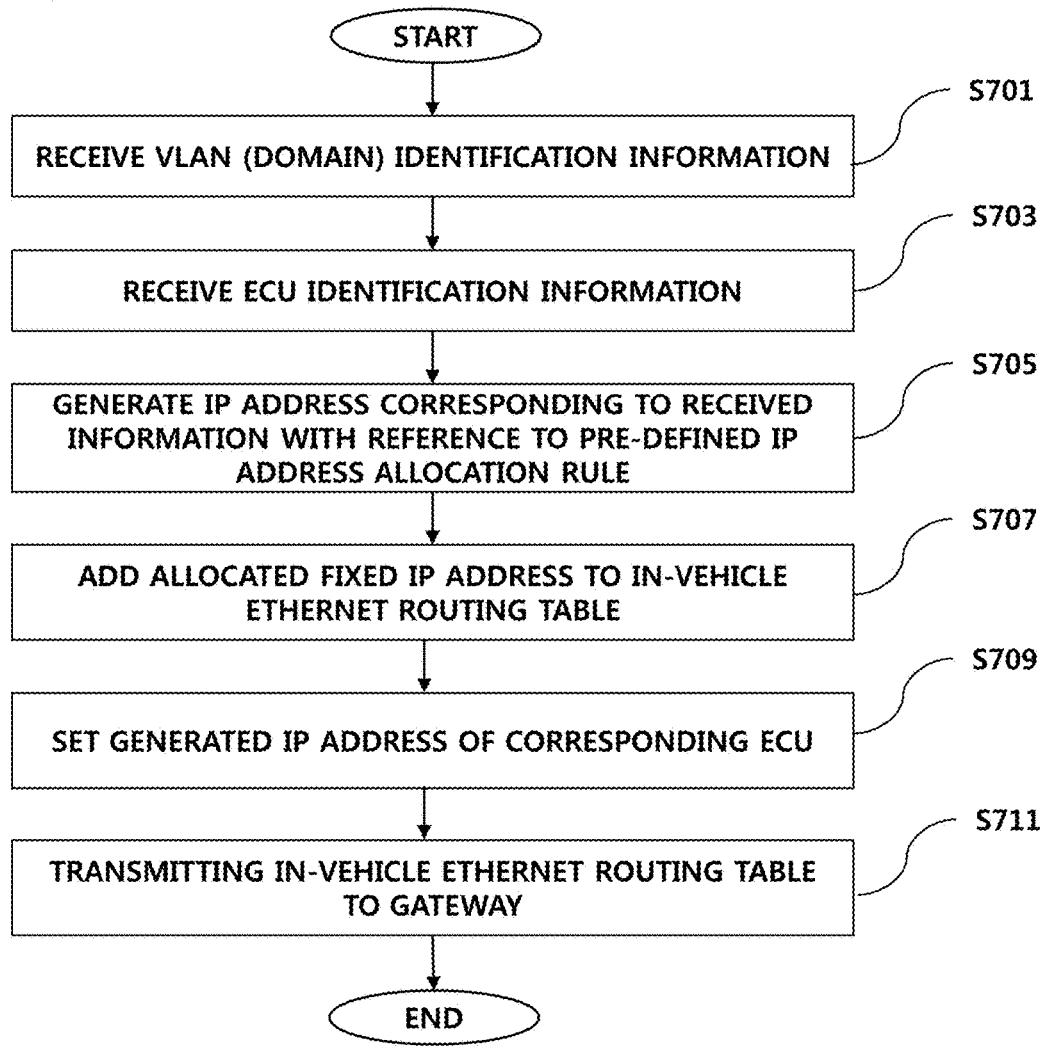
FIG. 7 is a flowchart illustrating an IP address allocation method in an address allocation device.

FIG. 7 is a flowchart illustrating an IP address allocation method in an address allocation device.

As an example, the address allocation device may be the OBD terminal 450 interlocking with the gateway 400. As another example, the address allocation device may be a separate computer device or smartphone in which an address allocation program or application is loaded.

With reference to FIG. 7, the address allocation device may receive the domain or VLAN identification information and ECU identification information of an ECU, to which an IP address will be allocated, through a designated user interface screen (Operations S701 and S703). Here, the ECU identification information may include ECU group identification information and each ECU type information.

Thereafter, the address allocation device may generate an IP address corresponding to the input information with reference to a pre-defined address allocation rule (Operation S705).

The address allocation device may add the generated IP address to an in-vehicle Ethernet routing table (Operation S707).

The address allocation device may set the generated IP address of the corresponding ECU and then transmit the in-vehicle Ethernet routing table to the gateway (Operations S709 to S711).

Here, the gateway may broadcast the received in-vehicle Ethernet routing table to connected domains. Therefore, all nodes connected to the in-vehicle Ethernet network may synchronize and maintain the in-vehicle Ethernet routing table.

Figure 8:
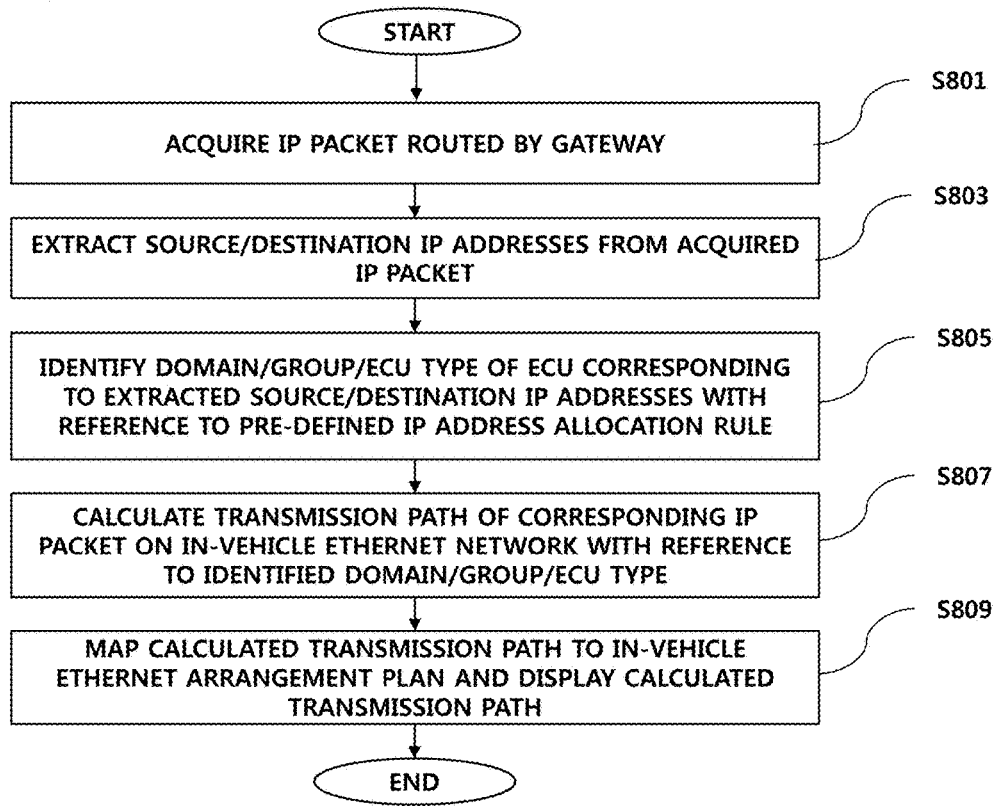
FIG. 8 is a flowchart illustrating an IP packet monitoring method in an OBD terminal connected to a gateway.

FIG. 8 is a flowchart illustrating an IP packet monitoring method in an OBD terminal connected to a gateway.

With reference to FIG. 8, the OBD terminal may acquire an IP packet routed by the gateway and extract a source IP address and a destination IP address from the acquired IP packet (Operations S801 and S803).

The OBD terminal may identify the domain, group and ECU type of an ECU corresponding to the extracted source IP address and destination IP address with reference to a pre-defined address allocation rule (Operation S805).

The OBD terminal may calculate a transmission path of the corresponding IP packet on an in-vehicle Ethernet network with reference to the identified domain/group/ECU type (Operation S807).

Thereafter, the OBD terminal may map the calculated transmission path to an in-vehicle Ethernet arrangement plan and display the calculated transmission path on the screen of a display (Operation S809).

Further, the OBD terminal may transmit a designated IP packet masking request signal to control the kind of the IP packet, which is an object to be monitored, to the gateway prior to Operation S801. That is, the IP packet masking request signal may include at least one of domain identification information, group identification information ECU type identification information to indicate an IP packet which will be masked by the gateway. For example, if the IP packet masking request signal includes specific group identification information, the gateway may filter the IP packet which is transmitted from or received by all ECUs corresponding to the corresponding group identification information and transmit the filtered IP packet to the OBD terminal.

Figure 9:
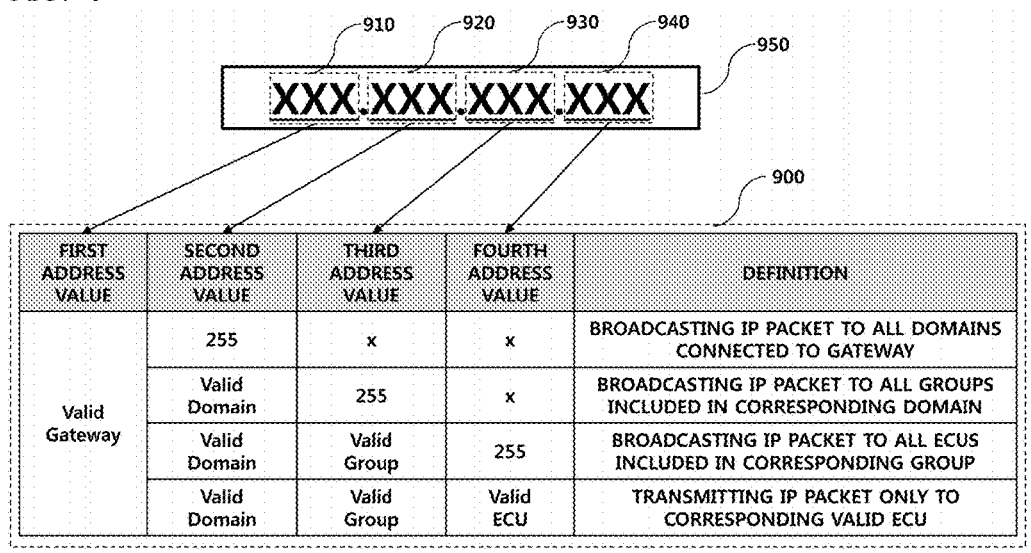
FIG. 9 is a broadcast IP address table illustrating an IP address setting method for broadcasting.

FIG. 9 is a broadcast IP address table 900 illustrating an IP address setting method for broadcasting.

A node connected to an in-vehicle Ethernet network in accordance with one embodiment of the present invention may control broadcasting in a gateway/domain/group unit with reference to the broadcast IP address table 900. From a different standpoint, control of broadcasting in the gateway/domain/group unit on the in-vehicle Ethernet network may be interpreted as control of multicasting on the overall in-vehicle Ethernet system.

With reference to FIG. 9, if a transmission node desires to broadcast an IP packet to all domains connected to a specific gateway, the transmission node may set a first address value 910 of a destination IP address 950 corresponding to the corresponding gateway, set a designated address value indicating broadcasting, for example, 255, as a second address value 920, and transmit an IP packet including the set destination IP address 950.

Further, if the transmission node desires to broadcast an IP packet to all groups included in a specific domain, the transmission mode may set address values corresponding to a corresponding gateway and the corresponding domain as the first address value 910 and the second address value 920 of the destination IP address 950, set a designated address value indicating broadcasting, for example, 255, as a third address value 930, and transmit an IP packet including the set destination IP address 950.

Similarly, if the transmission node desires to broadcast an IP packet to all ECUs included in a specific group, the transmission mode may set address values corresponding to a corresponding gateway, a corresponding domain and the corresponding group as the first address value 910, the second address value 920 and the third address value 930 of the destination IP address 950, set a designated address value indicating broadcasting, for example, 255, as a fourth address value 940, and transmit an IP packet including the set destination IP address 950.

Information included in the broadcast IP address table 900 may be included in an in-vehicle Ethernet routing table. In this case, respective nodes connected to the in-vehicle Ethernet network may perform multicasting and broadcasting in the gateway/domain/group unit with reference to the in-vehicle Ethernet routing table.

In the operation of multicasting, at least one destination IP address may be included in one IP packet. For example, if a transmission node needs to transmit an IP packet to be multicast to a powertrain domain and a multimedia domain, as shown in FIGS. 3 and 9, the corresponding transmission node may transmit the corresponding IP packet including two destination IP addresses for broadcasting in the domain unit. In this case, the two destination IP addresses may be set to 10.50.255.0 and 10.100.255.0.

Similarly the above method, if an IP packet is multicast to a plurality of groups of the same domain or multicast to a plurality of groups included in different domains, the transmission node may perform multicasting by setting a plurality of destination IP addresses for broadcasting in the group unit.

As apparent from the above description, effects of methods and systems in accordance with implementations of the present invention will be described as follows.

First, implementations of the present invention provide methods and systems for providing an optimized Ethernet communication method for a vehicle.

Second, implementations of the present invention provide a software architecture for providing Ethernet communication optimized for vehicle environments.

Third, implementations of the present invention provide an Ethernet middleware architecture adapted to vehicle environments.

Fourth, implementations of the present invention provide methods and systems for providing an optimized Ethernet communication method for a vehicle through which a network initialization speed may be improved by applying a static IP allocation policy to each ECU in the vehicle.

Fifth, implementations of the present invention provide methods and systems for providing an optimized Ethernet communication method for a vehicle through which a system processing speed and complexity may be improved by removing and/or integrating unnecessary modules and functions in a conventional Ethernet software architecture.

Sixth, implementations of the present invention provide in-vehicle Ethernet communication methods and systems which provide a simple and lightweight Ethernet software hierarchical structure and thus have high extensibility and portability.

Seventh, implementations of the present invention provide network management/control/diagnostic message transmission functions of a conventional in-vehicle Controller Area Network (CAN) to Ethernet environments.

The description of this disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for allocating an address to an Electronic Control Unit (ECU) on an in-vehicle Ethernet network comprising:
   allocating a first address value to identify the in-vehicle Ethernet network;
   allocating a second address value to identify a domain corresponding to the ECU;
   allocating a third address value to identify a group of ECUs in the domain;
   allocating a fourth address value to identify the ECU in the group; and
   generating an Internet Protocol (IP) address including the allocated first to fourth address values,
   wherein the generated IP address is set as a fixed IP address of the ECU.

2. The method according to claim 1, wherein an interconnection structure of at least one ECU included in the group is identified using the fourth address value.

3. The method according to claim 1, wherein the IP address has an Internet Protocol version 4 (IPv4) address scheme.

4. The method according to claim 3, wherein the IP address is allocated within a range of class A of private internet addresses defined in Request for Comment 1918 (RFC-1918).

5. The method according to claim 1, wherein multicasting on the in-vehicle Ethernet network is controlled using the first to fourth address values of an IP packet to be transmitted.

6. The method according to claim 5, wherein broadcasting in a gateway unit is controlled using the first and second address values included in a destination IP address.

7. The method according to claim 5, wherein broadcasting in a domain unit is controlled using the first and third address values included in a destination IP address.

8. The method according to claim 5, wherein broadcasting in a group unit is controlled using the first and fourth address values included in a destination IP address.

9. The method according to claim 1, wherein the group includes at least one ECU requiring the same security level.

10. The method according to claim 1, wherein the domain includes at least one of a body domain, a powertrain domain, a multimedia domain and a chassis domain.

11. A device for allocating an address to an Electronic Control Unit (ECU), the device comprising:
    a unit configured to receive first information that identifies a domain connected to a gateway;
    a unit configured to receive second information that identifies the ECU in the domain;
    a unit configured to generate an IP address corresponding to the first information and the second information with reference to a pre-defined IP address allocation rule; and
    a unit configured to allocate the generated IP address to the ECU,
    wherein the ECU is connected to an in-vehicle Ethernet network.

12. The device according to claim 11, wherein the domain includes at least one of a body domain, a powertrain domain, a multimedia domain and a chassis domain.

13. The device according to claim 11, wherein the second information includes third information to identify a group in the domain and fourth information to identify an interconnection structure of ECUs in the group and an ECU type.

14. The device according to claim 13, wherein the group includes at least one ECU requiring the same security level.

15. The device according to claim 11, further comprising a unit configured to transmit the IP address allocated to the ECU to the gateway,
    wherein the gateway sets the allocated IP address as a fixed IP address of the ECU.

16. The device according to claim 15, further comprising:
    a unit configured to generate an in-vehicle Ethernet routing table in which IP addresses according to domains and groups are mapped; and
    a unit configured to transmit the generated in-vehicle Ethernet routing table to the gateway.

17. A gateway for allocating an address to an Electronic Control Unit (ECU) connected to an in-vehicle Ethernet network, the gateway comprising:
    a unit configured to receive an in-vehicle Ethernet routing table, in which IP addresses allocated to the ECU according to domains and groups of the in-vehicle Ethernet network are mapped, from an external device;

a unit configured to set an IP address allocated to the ECU using the in-vehicle Ethernet routing table; and a unit configured to transmit the in-vehicle Ethernet routing table to the ECU using the set IP address, wherein the gateway and the ECU control transmission and reception of an IP packet using the in-vehicle Ethernet routing table.

18. The gateway according to claim 17, wherein, when the IP packet is received, multicasting on the in-vehicle Ethernet network is controlled using a destination IP address included in the IP packet and the in-vehicle Ethernet routing table.

19. The gateway according to claim 18, wherein the IP address includes a first address value identifying the gateway, a second value identifying a domain connected to the gateway, a third value identifying a group in the domain, and a fourth value identifying an ECU type in the group.

20. The gateway according to claim 19, wherein broadcasting in a gateway unit is controlled using the first address value and the second address value included in the destination IP address.

21. The gateway according to claim 19, wherein broadcasting in a domain unit is controlled using the first address value and the third address value included in the destination IP address.

22. The gateway according to claim 19, wherein broadcasting in a group unit is controlled using the first address value and the fourth address value included in the destination IP address.

* * * * *